(12) United States Patent
Bansal et al.

(10) Patent No.: US 12,039,373 B2
(45) Date of Patent: Jul. 16, 2024

(54) DYNAMIC THROTTLING BASED ON HEALTH METRICS

(71) Applicant: MICROSOFT TECHNOLOGY LICENSING, LLC, Redmond, WA (US)

(72) Inventors: Deepak Bansal, Bellevue, WA (US); Vaibhav Kumar, Kirkland, WA (US); Xin Yan, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 18/297,156

(22) Filed: Apr. 7, 2023

(65) Prior Publication Data

US 2023/0297435 A1 Sep. 21, 2023

Related U.S. Application Data

(62) Division of application No. 16/870,765, filed on May 8, 2020, now Pat. No. 11,650,852.

(51) Int. Cl.
*G06F 9/50* (2006.01)
*G06F 9/455* (2018.01)
*G06F 11/30* (2006.01)
*H04L 67/61* (2022.01)

(52) U.S. Cl.
CPC .......... *G06F 9/505* (2013.01); *G06F 9/45558* (2013.01); *G06F 11/301* (2013.01); *H04L 67/61* (2022.05); *G06F 2009/45595* (2013.01)

(58) Field of Classification Search
CPC .... G06F 9/505; G06F 9/45558; G06F 11/301; G06F 2009/45595; G06F 2201/81; G06F 9/5083; G06F 11/3006; G06F 11/3055; G06F 2009/45591; G06F 2209/504; H04L 67/61; Y02D 10/00
See application file for complete search history.

(56) References Cited

U.S. PATENT DOCUMENTS 10,432,483 B1 * 10/2019 Thompson ............ H04L 43/045
2019/0182168 A1 * 6/2019 Bastide ................. H04L 47/24

* cited by examiner

*Primary Examiner* — Sisley N Kim
(74) *Attorney, Agent, or Firm* — Han Gim; Newport IP, LLC

(57) ABSTRACT

Techniques are disclosed for dynamically adjusting a throttling threshold in a multi-tenant virtualized computing environment. System health parameters are collected during a predetermined time interval. A system health status of the multi-tenant virtualized computing environment is determined. Based on the system health status, a throttling threshold for service requests for the multi-tenant virtualized computing environment is determined. The throttling threshold is applied for further service requests. During a subsequent time interval, an updated system health status of the multi-tenant virtualized computing environment is determined based on system health parameters received during the subsequent time interval. The throttling threshold is updated based on the updated system health status. The updated throttling threshold is applied for further service requests.

18 Claims, 9 Drawing Sheets

DYNAMIC THROTTLING BASED ON HEALTH METRICS

CROSS-REFERENCE TO RELATED APPLICATION

This application is a division of U.S. patent application Ser. No. 16/870,765, filed May 8, 2020, the content of which application is hereby expressly incorporated herein by reference in its entirety.

BACKGROUND

A data center is a facility that houses computer systems and various networking, storage, and other related components. Data centers may, for example, provide computing services to businesses and individuals as a remote computing service or provide "software as a service" (e.g., cloud computing). To facilitate efficient utilization of data center resources, virtualization technologies allow a physical computing device to host one or more virtual machines (VM) that appear and operate as independent computer devices to a connected user. The data center can create, maintain or delete virtual machines in a dynamic manner.

Data centers may receive various requests for tasks and services from requesting services or tenants, requiring that the workload at the data center be managed. It is with respect to these considerations and others that the disclosure made herein is presented.

SUMMARY

Service providers of virtualized computing resources may implement mechanisms to throttle incoming workloads to protect the providers' services from overload and to ensure fairness for multi-tenant services. However, determining throttle thresholds can be difficult due to continuous changes at the service providers based on overall workloads on their systems as well as the performance of the underlying infrastructures.

The disclosed embodiments describe technologies for providing a dynamic mechanism for throttling the incoming workloads based on health metrics of the service provider' systems. Such a dynamic mechanism differs from current static throttling mechanisms which need to be carefully tuned and may not be effective in all situations. By observing the performance-related health metrics of the systems, the systems may initiate throttling when the health metrics indicate a potentially overloaded state, and reduce or deactivate the throttling when the health metrics return to a healthy state. Reduction of throttling may at least be in part due to load reduction resulting from the throttling. Additionally, hysteresis may be built into the system as well as the throttling controls.

Multi-tenant service providers may expose application programming interfaces (APIs) for services such as the provisioning of virtual machines, IP addresses, and other services related to provision of virtualized computing resources. Various users of the series place different loads on the multi-tenant services, and the aggregate load can become significant. In such scenarios, the service provider needs to throttle requested services in order to protect its throughput capacity and prevent performance degradation.

Traditional mechanisms for throttling in the control plane are static. Predefined and static throttling levels may be placed on the provided services on a per customer basis, service-wide, or based on the source of a requested service. The static throttling levels are typically established in advance or injected manually in response to a service issue. The static throttling levels are manually derived, and typically determined for an assumed load. However, a problem with static throttling levels is that performance of services is dependent on a number of factors, such as the types of loads and the performance of underlying infrastructure. Static limits are typically set up for the worst-case factors, and otherwise are difficult to tune even when the loads change over time.

The present disclosure provides a way to maintain system stability even when the capacity of the system changes by monitoring the health of the system, determining if the health of the system is degrading, and dynamically throttling incoming work requests. The health of the system may be determined based on factors such as the latency for responding to requests, the throughput that the system is delivering, failure rates, CPU usage, memory usage, backlog size or queue size, number of active threads, and other health metrics. The factors can be tailored to each type of system. Once the system determines if the system performance is degrading, a dynamic throttling mechanism may be implemented that is responsive to the level of degradation.

In one embodiment, the throttling level can be linear. In one example, the throttling level can be proportional to the system degradation level, within upper and lower limits. In one embodiment, the throttling level can include hysteresis to avoid continuous throttle cycling.

In an embodiment, the sender of the request may be notified that throttling has started so that the sender can back off sending requests. In an embodiment, throttling may be selective and based on users who are submitting the highest volume of requests.

In an embodiment, the throttling levels can be set using an additive increase/multiplicative decrease scheme. Additionally, a minimum and maximum threshold level may be defined. To illustrate, if the system is determined to be unhealthy, throttling may be activated at an initial level of 1000. The initial throttling level may be configurable and may be based on the health of the system. At a predetermined time interval, the throttling level may be evaluated based on the current health of the system. If it is determined that the system is unhealthy, the throttling level may be decreased by a factor of 0.50, resulting in a new throttling level of 500. If the system is unhealthy at the next time interval, then the throttling level may be decreased using the multiplicative factor of 0.50, resulting in throttling levels of 250, 125, and so on, down to a minimum throttling level. If the system health is determined to be healthy, then the throttling level may be increased by an additive factor. For example, if the throttling level is 250, then the throttling level may be increased by adding 50 for each time interval during which the system is found to be healthy. The throttling level may be increased up to a maximum threshold. The minimum and maximum thresholds may be configurable.

The described techniques can allow for maintaining efficient use of computing resources such as processor cycles, memory, network bandwidth, and power, while reducing potential loss of data and services and downtime, resulting in impact to end users.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter.

Furthermore, the claimed subject matter is not limited to implementations that solve any or all disadvantages noted in any part of this disclosure.

DRAWINGS

The Detailed Description is described with reference to the accompanying figures. In the description detailed herein, references are made to the accompanying drawings that form a part hereof, and that show, by way of illustration, specific embodiments or examples. The drawings herein are not drawn to scale. Like numerals represent like elements throughout the several figures.

DETAILED DESCRIPTION

Figure 1:
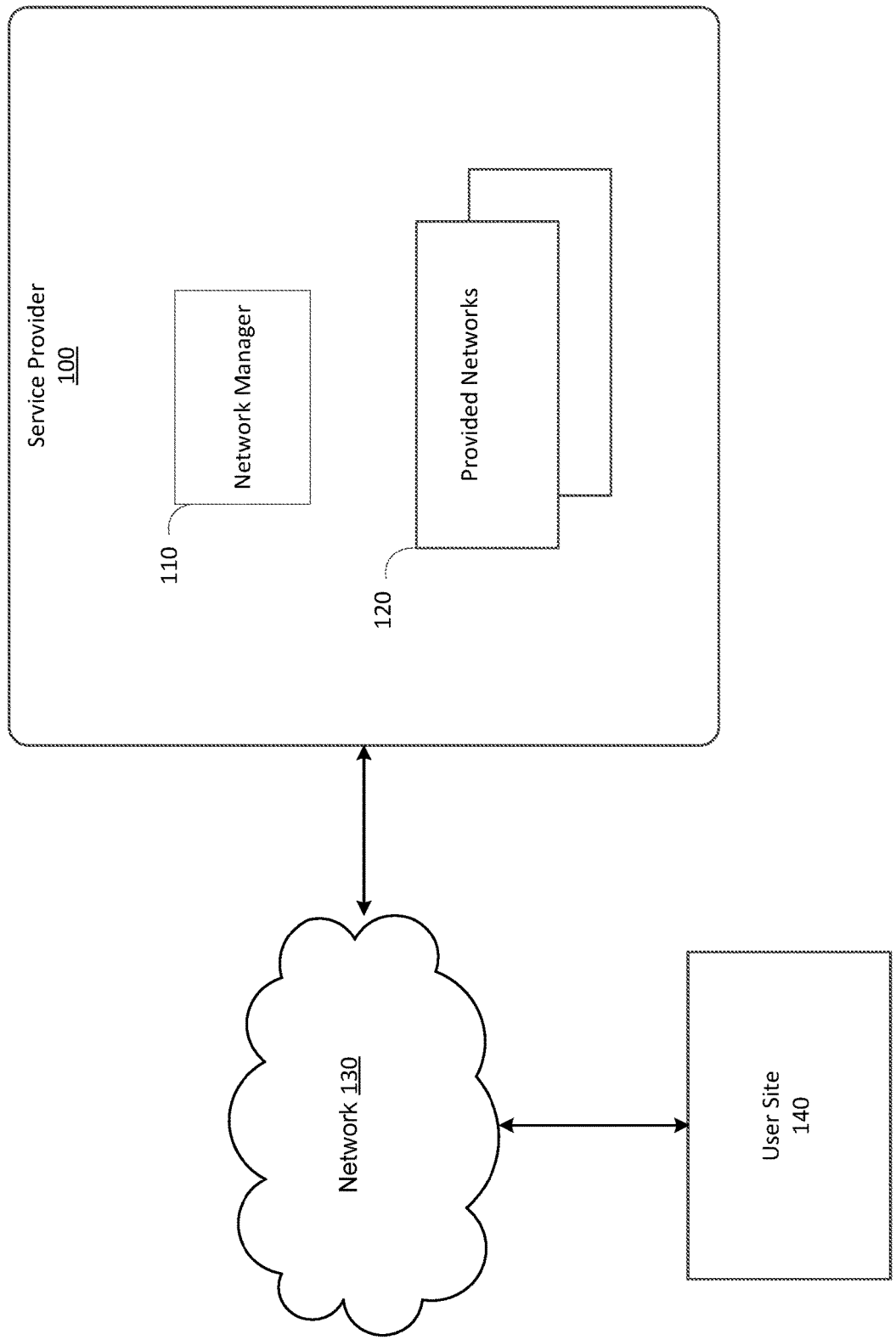
FIG. 1 is a diagram illustrating a data center for providing virtualized resources in accordance with the present disclosure.

Static throttling of workloads may be insufficient to protect systems of a data center from being overloaded. For example, the performance of a network manager can become degraded, or dependent fabric services can become degraded when the system is overloaded. In such circumstances, a preconfigured static threshold may no longer be valid. Disclosed herein are various systems and methods for protecting various data center services, such as network manager internal microservices, against unexpected circumstances when preconfigured limits become invalid for the service. Various embodiments are described for providing a dynamic mechanism for throttling the incoming workloads based on health metrics of the system. Additionally, the disclosed throttling mechanisms can protect users from indiscriminate throttling which may allow heavy users to impact users with normal usage.

In an embodiment, the throttling threshold can be dynamically updated for services in one or more partitions of a provider network, for example for the network manager. In some embodiments, a dynamic throttling library may be provided. The dynamic throttling library may be part of an internal client manager, which may be a library configured for communication within the network manager's internal services. The dynamic throttling can be inherited by the internal services.

A requesting user may submit requests to an API within a configured threshold. At a pre-determined time interval, a thread in the sender service may be activated and the thread may determine the throttling limit for the next time interval based on specified parameters. The newly determined throttling limit may be applied to requesting users at the next time interval.

In an embodiment, the throttling limit may be referred to as a throttling threshold (TT) that is defined as an integer value. The throttling threshold indicates that if a gateway sees a greater number of user calls than the throttling threshold during a predefined interval, then the gateway only accepts the number of calls specified by the TT and throttles all other calls received during that time interval. For example, if the throttling threshold is 50 in a 1-minute interval and if gateways receive 90 calls during that 1-minute interval, then the gateways will only accept 50 calls and throttle the remaining 40 calls during that 1-minute interval. Gateways may perform the same process during each 1-minute interval.

In an embodiment, a health monitor may be implemented that may be a dedicated thread which executes at every predetermined (e.g., 1 minute) time interval, referred to herein as a health monitor interval. The health monitor thread may be configured to monitor the parameters defined below and determine the throttling threshold for the next time interval.

Gateways may store the number of calls received during a health monitor interval. Gateways may also store the number of calls that failed. Using this information, the health monitor may determine the failure rate during the last monitoring interval. The values for total calls and failed calls may be reset at the start of every interval. If the failure rate is below a predetermined threshold, then the health monitor may mark the system as unhealthy. The system may be any service or set of services that can be identified as a destination, for example using a Uniform Resource Identifier (URI).

The following example failures may be used as indications of health degradation:
  TimeOut Exception
  Communication Exception
  Any RnmFault (network manager) exception which is not a user error, or
  not a retriable error, or
  throttling error.

In some embodiments, gateways may store the total time required to complete all calls during the last monitoring interval. Gateways may also store the total number of calls received during the last monitoring interval. Using this information, gateways may determine the average time/latency to complete one call. Gateways can maintain a history for these values in memory and check if the values are above a predetermined threshold. If the average time to complete calls remain above the threshold for a previous number of (e.g., 10*1 minute) monitoring intervals, then the gateways may determine that the service is unhealthy.

If it is determined that the health status is degraded during the last monitoring cycle, the throttling threshold may be decreased (i.e., a lesser number of calls are allowed) for the next monitoring cycle. If the gateways determine that the health status is healthy during the last monitoring cycle, the throttling threshold may be increased (i.e., a greater number of calls are allowed) for the next monitoring cycle.

In some embodiments, an additive-increase/multiplicative-decrease (AIMD) algorithm may be implemented for the throttling threshold. AIMD is a feedback control algorithm that is used in TCP congestion control and may be implemented herein to calculate the throttling threshold for the next monitoring interval. In an embodiment, whenever the health status is degraded in the last monitoring cycle, the throttling threshold may be reduced by half for the next monitoring cycle. However, when the health status is healthy in the last monitoring cycle, a constant value may be added to the throttling threshold. It should be understood that the constant value may be configurable. It should also be understood that the multiplicative factor may be configurable.

Additionally, a lower limit and upper limit may be implemented for the throttling threshold beyond which the health monitor will not increase or decrease the throttling threshold. The upper and lower throttling threshold may be a configurable value.

In some embodiments, dynamic throttling functionality may be implemented as a service within the network manager, which may be referred to generally as a backend stateful microservice, or as a microservice. The microservice may be configured to throttle calls to create a new resource instance for a resource based on numbers of pending deletions of previous resource instances. If the count of pending resource instances is above a predetermined threshold, then creation of resource instances may fail with a throttling exception.

The microservice can lower the threshold if the health of the microservice is degraded. Hence, the microservice threshold can change based on the microservice health. In some embodiments, microservice health can be determined based on the In-Memory Object Store (IMOS) commit duration, which is used by the network controller to store its state.

In some embodiments, dynamic throttling may be implemented while existing static throttling mechanisms are in place. A gateway may perform subscription-based throttling where the gateway can determine whether to shed a percentage of a load for any specific subscription. The gateway may also perform static throttling based on the total number of calls that have been observed across all partitions in a specified interval and throttle the remaining calls in the same interval if the number of calls exceeds a static threshold. If calls then reach the dynamic throttling layer in the gateway, the dynamic throttling layer may determine whether to throttle calls per URI/microservice destination.

If calls reach the microservice, the microservice may have a static number established where the microservice can throttle calls based on the number of inflight operations (including the number of inflight operations in background threads). Background threads are not throttled but may be used to count toward the number of inflight operations.

In some embodiments, dynamic throttling may be overridden, interrupted, or paused based on specified observed behaviors such as if the health degrades beyond a predetermined level.

Referring to the appended drawings, in which like numerals represent like elements throughout the several FIGURES, aspects of various technologies for remote management of computing resources will be described. In the following detailed description, references are made to the accompanying drawings that form a part hereof, and which are shown by way of illustration specific configurations or examples.

FIG. 1 illustrates an example computing environment in which the embodiments described herein may be implemented. FIG. 1 illustrates a service provider 100 that is configured to provide computing resources to users at user site 140. The user site 140 may have user computers that may access services provided by service provider 100 via a network 130. The computing resources provided by the service provider 100 may include various types of resources, such as computing resources, data storage resources, data communication resources, and the like. For example, computing resources may be available as virtual machines. The virtual machines may be configured to execute applications, including Web servers, application servers, media servers, database servers, and the like. Data storage resources may include file storage devices, block storage devices, and the like. Networking resources may include virtual networking, software load balancer, and the like.

Service provider 100 may have various computing resources including servers, routers, and other devices that may provide remotely accessible computing and network resources using, for example, virtual machines. Other resources that may be provided include data storage resources. Service provider 100 may also execute functions that manage and control allocation of network resources, such as a network manager 110.

Network 130 may, for example, be a publicly accessible network of linked networks and may be operated by various entities, such as the Internet. In other embodiments, network 130 may be a private network, such as a dedicated network that is wholly or partially inaccessible to the public. Network 130 may provide access to computers and other devices at the user site 140.

Figure 2:
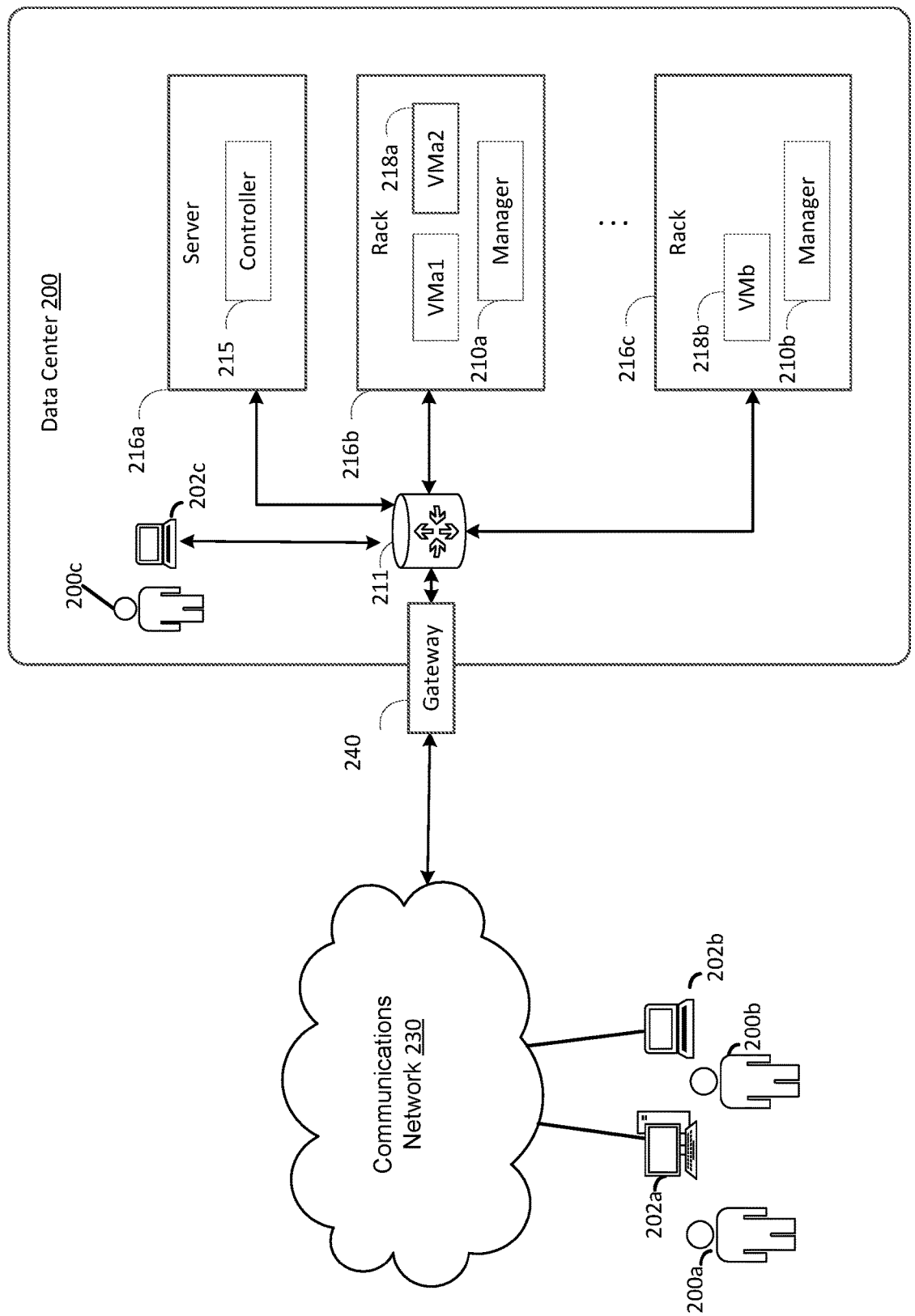
FIG. 2 is a diagram illustrating a data center for providing virtualized resources in accordance with the present disclosure.

FIG. 2 illustrates an example computing environment in which the embodiments described herein may be implemented. FIG. 2 illustrates a data center 200 that configured to provide computing resources to users 200a, 200b, or 200c (which may be referred herein singularly as "a user 200" or in the plural as "the users 200") via user computers 202a, 202b, and 202c (which may be referred herein singularly as "a computer 202" or in the plural as "the computers 202") via a communications network 230. The computing resources provided by the data center 200 may include various types of resources, such as computing resources, data storage resources, data communication resources, and the like. Each type of computing resource may be general-purpose or may be available in a number of specific configurations. For example, computing resources may be available as virtual machines. The virtual machines may be configured to execute applications, including Web servers, application servers, media servers, database servers, and the like. Data storage resources may include file storage devices, block storage devices, and the like. Each type or configuration of computing resource may be available in different configurations, such as the number of processors, and size of memory and/or storage capacity. The resources may in some embodiments be offered to clients in units referred to as instances, such as virtual machine instances or storage instances. A virtual computing instance may be referred to as a virtual machine and may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

Data center 200 may include servers 216a, 216b, and 216c (which may be referred to herein singularly as "a server 216" or in the plural as "the servers 216") that provide computing resources available as virtual machines 218a and 218b (which may be referred to herein singularly as "a virtual machine 218" or in the plural as "the virtual machines 218"). The virtual machines 218 may be configured to execute applications such as Web servers, application servers, media servers, database servers, and the like. Other resources that may be provided include data storage resources (not shown on FIG. 2) and may include file storage devices, block storage devices, and the like. Servers 216 may also execute functions that manage and control allocation of resources in the data center, such as a controller 215. Controller 215 may be a fabric controller or another type of program configured to manage the allocation of virtual machines on servers 216.

Referring to FIG. 2, communications network 230 may, for example, be a publicly accessible network of linked networks and may be operated by various entities, such as the Internet. In other embodiments, communications network 230 may be a private network, such as a corporate network that is wholly or partially inaccessible to the public.

Communications network 230 may provide access to computers 202. Computers 202 may be computers utilized by users 200. Computer 202a, 202b or 202c may be a server, a desktop or laptop personal computer, a tablet computer, a smartphone, a set-top box, or any other computing device capable of accessing data center 200. User computer 202a or 202b may connect directly to the Internet (e.g., via a cable modem). User computer 202c may be internal to the data center 200 and may connect directly to the resources in the data center 200 via internal networks. Although only three user computers 202a, 202b, and 202c are depicted, it should be appreciated that there may be multiple user computers.

Computers 202 may also be utilized to configure aspects of the computing resources provided by data center 200. For example, data center 200 may provide a Web interface through which aspects of its operation may be configured through the use of a Web browser application program executing on user computer 202. Alternatively, a stand-alone application program executing on user computer 202 may be used to access an application programming interface (API) exposed by data center 200 for performing the configuration operations.

Servers 216 may be configured to provide the computing resources described above. One or more of the servers 216 may be configured to execute a manager 120a or 120b (which may be referred herein singularly as "a manager 120" or in the plural as "the managers 120") configured to execute the virtual machines. The managers 120 may be a virtual machine monitor (virtual machineM), fabric controller, or another type of program configured to enable the execution of virtual machines 218 on servers 216, for example.

It should be appreciated that although the embodiments disclosed above are discussed in the context of virtual machines, other types of implementations can be utilized with the concepts and technologies disclosed herein. For example, the embodiments disclosed herein might also be utilized with computing systems that do not utilize virtual machines.

In the example data center 200 shown in FIG. 2, a router 211 may be utilized to interconnect the servers 216a and 216b. Router 211 may also be connected to gateway 240, which is connected to communications network 230. Router 211 may manage communications within networks in data center 200, for example, by forwarding packets or other data communications as appropriate based on characteristics of such communications (e.g., header information including source and/or destination addresses, protocol identifiers, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

It should be appreciated that the network topology illustrated in FIG. 2 has been greatly simplified and that many more networks and networking devices may be utilized to interconnect the various computing systems disclosed herein. These network topologies and devices should be apparent to those skilled in the art.

It should also be appreciated that data center 200 described in FIG. 2 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway, or other computing device may comprise any combination of hardware or software that can interact and perform the described types of functionality, including without limitation desktop or other computers, database servers, network storage devices and other network devices, PDAs, tablets, smartphone, Internet appliances, television-based systems (e.g., using set top boxes and/or personal/digital video recorders), and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Figure 3:
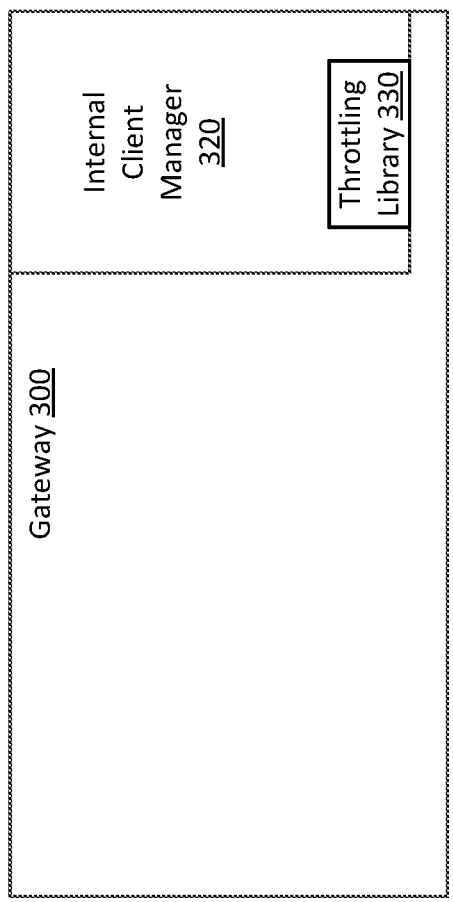
FIG. 3 is a diagram illustrating an example gateway in accordance with the present disclosure.

FIG. 3 illustrates an example implementation of dynamic throttling functionality. In an embodiment, the throttling threshold can be dynamically updated for services in one or more partitions of a provider network, for example for the network manager. In some embodiments, dynamic throttling functionality may be provided in a dynamic throttling library 330. The dynamic throttling library 330 may be implemented as a set of services that can added independently of other services. The dynamic throttling library 330 may be part of an internal client manager 320, which may be used for communication within the network manager's internal services in a gateway 300. The dynamic throttling functionality can be inherited by the internal services.

Figure 4:
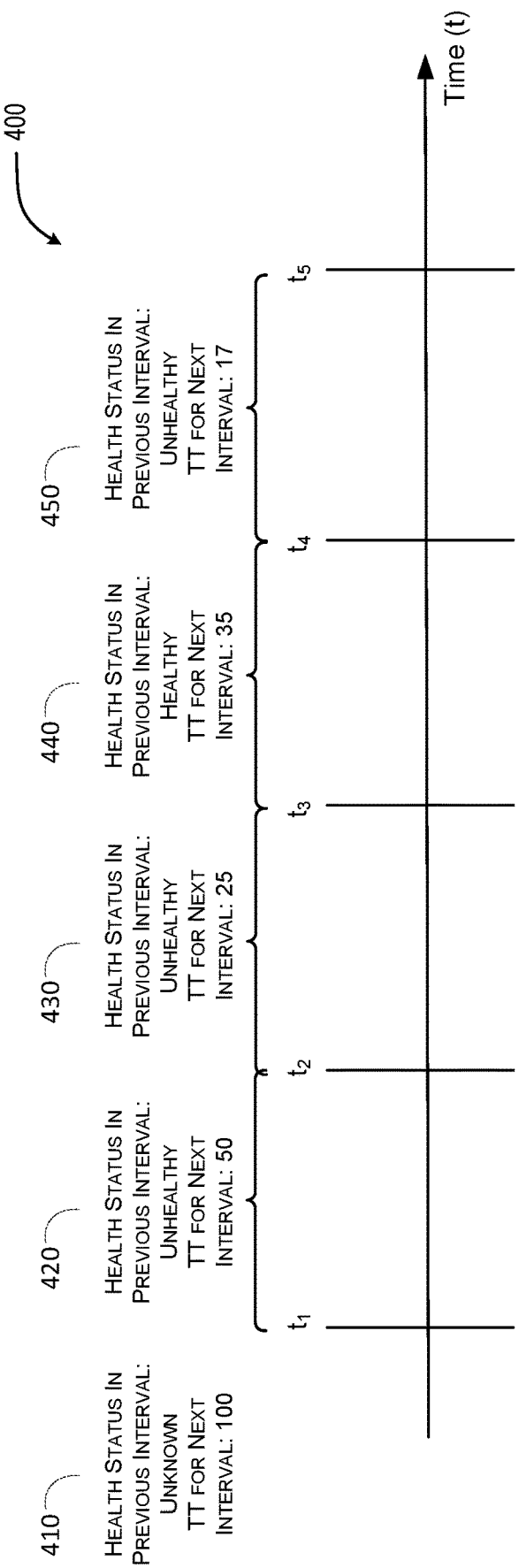
FIG. 4 is a diagram illustrating a timeline in accordance with the present disclosure.

FIG. 4 illustrates an example timeline 400 showing dynamic adjustment of a throttling threshold. A requesting user may submit requests to an API within a configured threshold 410 that is initially set at 100. At a pre-determined time interval, a thread in the sender service may activate and determine the throttling limit for the next time interval based on specified parameters. The newly determined throttling limit may be applied to requesting users at the next time interval. At the next time interval 420, it may be determined that the health status during the previous interval was unhealthy, and the throttling threshold may be reduced by 0.5, resulting in a throttling threshold of 50. At the next time interval 430, it may be determined that the health status during the previous interval was unhealthy, and the throttling threshold may be reduced by 0.5, resulting in a throttling threshold of 25. At the next time interval 440, it may be determined that the health status during the previous interval was healthy, and the throttling threshold may be increased by a constant value of 10, resulting in a throttling threshold of 35. At the next time interval 450, it may be determined that the health status during the previous interval was unhealthy, and the throttling threshold may be reduced by 0.5, resulting in a throttling threshold of 17.

Figure 5:
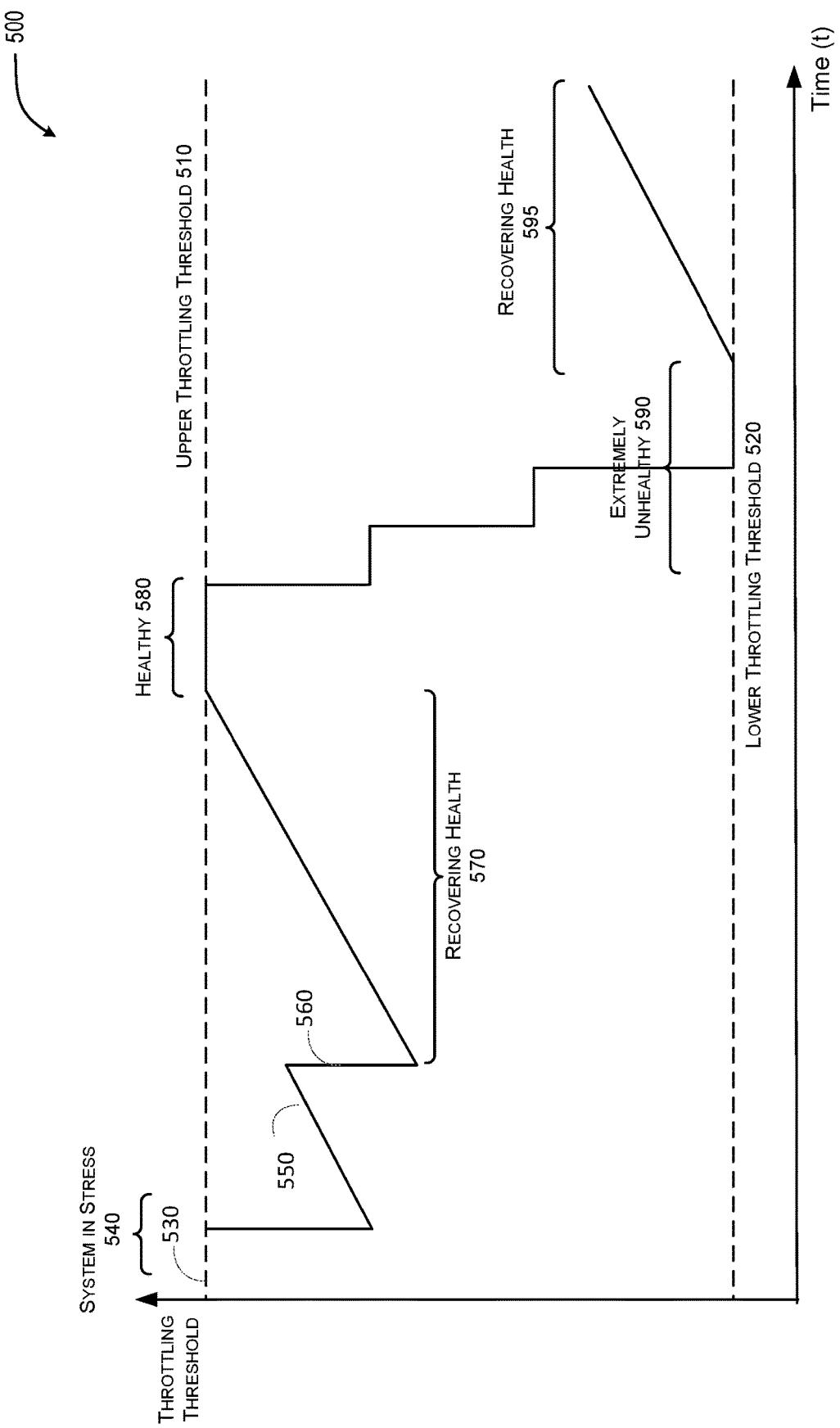
FIG. 5 is a diagram illustrating a timeline in accordance with the present disclosure.

FIG. 5 illustrates an example graph 500 depicting the change in throttling threshold over time. In the example, an additive-increase/multiplicative-decrease (AIMD) algorithm may be implemented for the throttling threshold. An upper throttling threshold 510 and lower throttling threshold 520 may be implemented for the throttling threshold beyond which the health monitor will not increase or decrease the throttling threshold. The throttling threshold may be set at the upper throttling threshold 510 during initial time interval 530. When it is determined that the system is under stress 540, the throttling threshold may be reduced by an initial multiplicative factor. When it is determined that the system is recovering 550, the throttling threshold may be increased by a constant additive factor. When it is determined that the system is under stress 560, the throttling threshold may be reduced by the multiplicative factor. During a period of recovering health 570, the throttling threshold may be increased by the constant additive factor until the upper throttling threshold 510 is reached. During a period of healthy status 560, the throttling threshold may remain at the upper throttling threshold 510. During a period that the system is extremely unhealthy 590, the throttling threshold may be reduced by the multiplicative factor until the lower throttling threshold 520 is reached. The throttling threshold remains at the lower throttling threshold 520 while the system continues to be unhealthy. When the system is in recovering health 595, the throttling threshold may be is increased by the constant additive factor.

Figure 6:
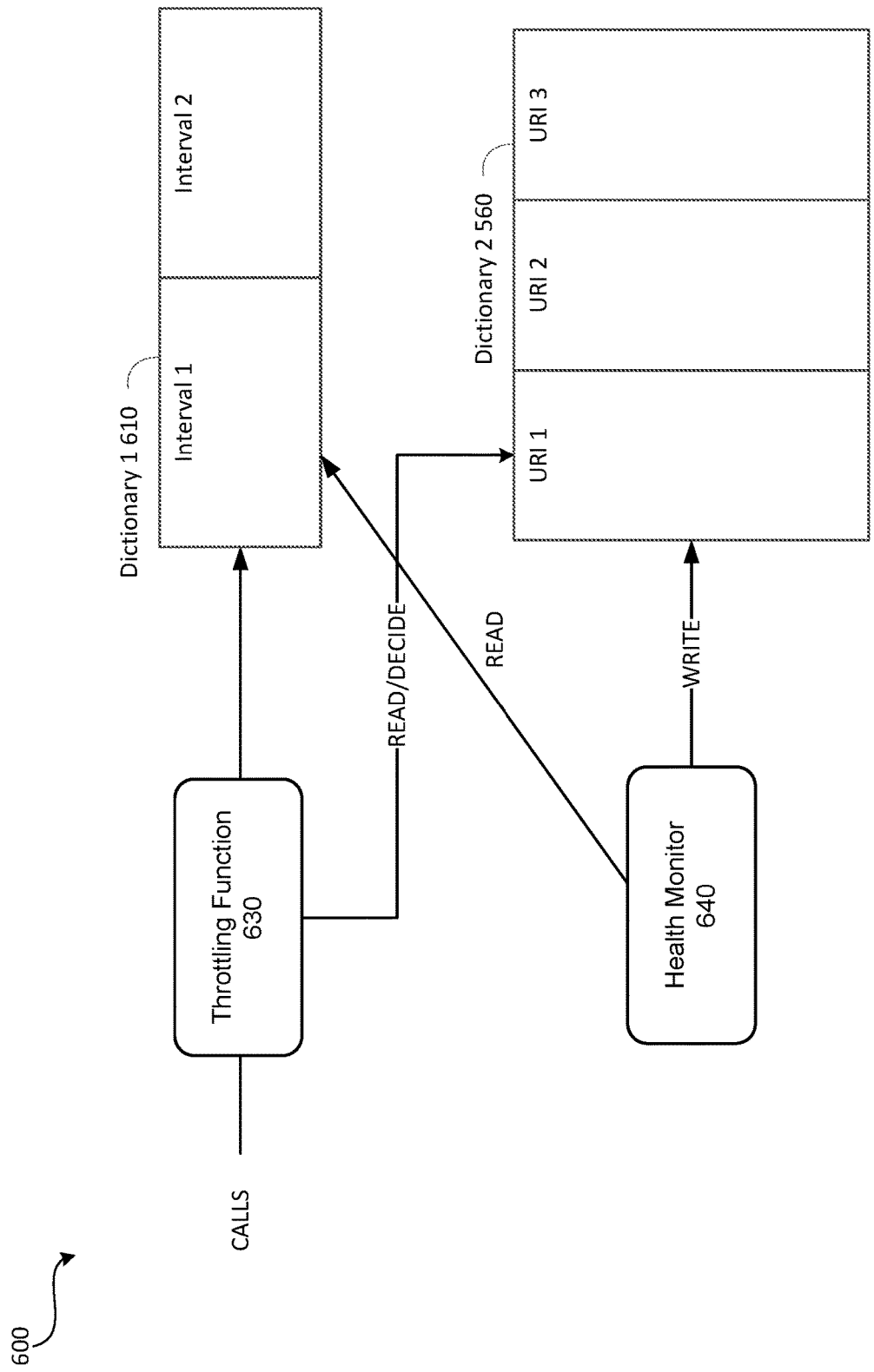
FIG. 6 is a diagram illustrating an example of a throttling function in accordance with the present disclosure.

FIG. 6 shows an example operational workflow 600 for implementing dynamic throttling. Dictionary1 610 may be keyed on each destination URI. Dictionary1 610 may be updated for each destination URI. Dictionary1 610 may maintain the total calls received in a time window, the total failed calls in the time window, history of average time for completing calls, and the failure rate in the last interval. Dictionary2 620 may read values from Dictionary 1 610 and update its data. When a call is received, throttling function 630 may take a read lock on Dictionary 1 610 and Dictionary 2 620 to read the current throttling threshold and total calls and determine whether to throttle. If throttling is not needed, then health monitor 640 may acquire a write lock for Dictionary1 610 to update the number of calls and number of failures and time taken to complete the call.

Figure 7:
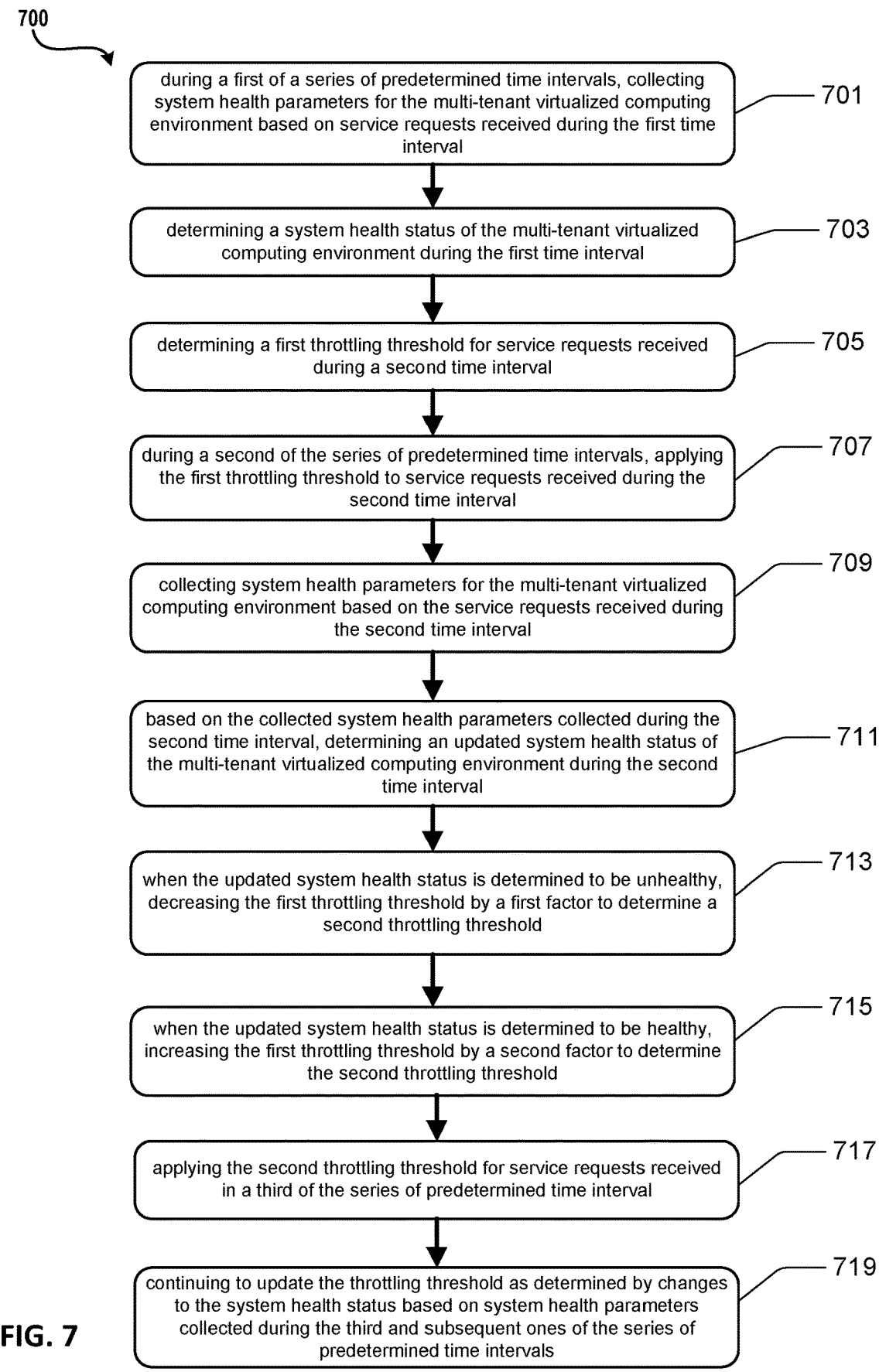
FIG. 7 is a flowchart depicting an example procedure for throttling in accordance with the present disclosure.

Turning now to FIG. 7, illustrated is an example operational procedure for dynamic throttling in accordance with the present disclosure. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like. Although the example routine described below is operating on a computing device, it can be appreciated that this routine can be performed on any computing system which may include a number of computers working in concert to perform the operations disclosed herein.

Thus, it should be appreciated that the logical operations described herein are implemented (1) as a sequence of computer implemented acts or program modules running on a computing system such as those described herein and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof.

Referring to FIG. 7, operation 701 illustrates during a first of a series of predetermined time intervals, collecting system health parameters for the multi-tenant virtualized computing environment based on service requests received during the first time interval.

Operation 701 may be followed by operation 703. Operation 703 illustrates based on the collected system health parameters, determining a system health status of the multi-tenant virtualized computing environment during the first time interval.

Operation 703 may be followed by operation 705. Operation 705 illustrates based on the system health status during the first time interval, determining a first throttling threshold for service requests received during a second of the series of predetermined time intervals, wherein the first throttling threshold is limited to a minimum throttling threshold and maximum throttling threshold.

Operation 705 may be followed by operation 707. Operation 707 illustrates during the second time interval, applying the first throttling threshold to service requests received during the second time interval.

Operation 707 may be followed by operation 709. Operation 709 illustrates collecting system health parameters for the multi-tenant virtualized computing environment based on the service requests received during the second time interval.

Operation 709 may be followed by operation 711. Operation 711 illustrates based on the collected system health parameters collected during the second time interval, determining an updated system health status of the multi-tenant virtualized computing environment during the second time interval.

Operation 711 may be followed by operation 713. Operation 713 illustrates when the updated system health status is determined to be unhealthy, decreasing the first throttling threshold by a first factor to determine a second throttling threshold.

Operation 713 may be followed by operation 715. Operation 715 illustrates when the updated system health status is determined to be healthy, increasing the first throttling threshold by a second factor to determine the second throttling threshold. In an embodiment, the second throttling threshold is limited to the minimum throttling threshold and maximum throttling threshold.

Operation 715 may be followed by operation 717. Operation 717 illustrates applying the second throttling threshold for service requests received in a third of the series of predetermined time intervals.

Operation 717 may be followed by operation 719. Operation 719 illustrates continuing to update the throttling threshold as determined by changes to the system health status based on system health parameters collected during the third and subsequent ones of the series of predetermined time intervals.

In an embodiment, the first factor is a multiplicative factor.

In an embodiment, the second factor is an additive factor.

In an embodiment, the system health parameters comprise latency for responding to the service requests, system throughput, service request failure rates, CPU usage, memory usage, backlog size, queue size, or a number of active threads.

In an embodiment, the continuing to update further comprises:

collecting system health parameters for the multi-tenant virtualized computing environment based on service requests received during the third and subsequent ones of the series of predetermined time intervals;

based on the system health parameters collected during the third and subsequent time intervals, determining a system health status of the multi-tenant virtualized computing environment during the third and subsequent time intervals; and based on the system health status during the third and subsequent time intervals, determining subsequent throttling thresholds for service requests for the multi-tenant virtualized computing environment.

In an embodiment, the throttling threshold is applied to service requests from an identified user.

In an embodiment, the method further comprises sending a notification to users indicating that the throttling threshold has been applied.

In an embodiment, throttling thresholds are determined by one or more gateways of the multi-tenant virtualized computing environment that are configured to receive service requests via an API.

Figure 8:
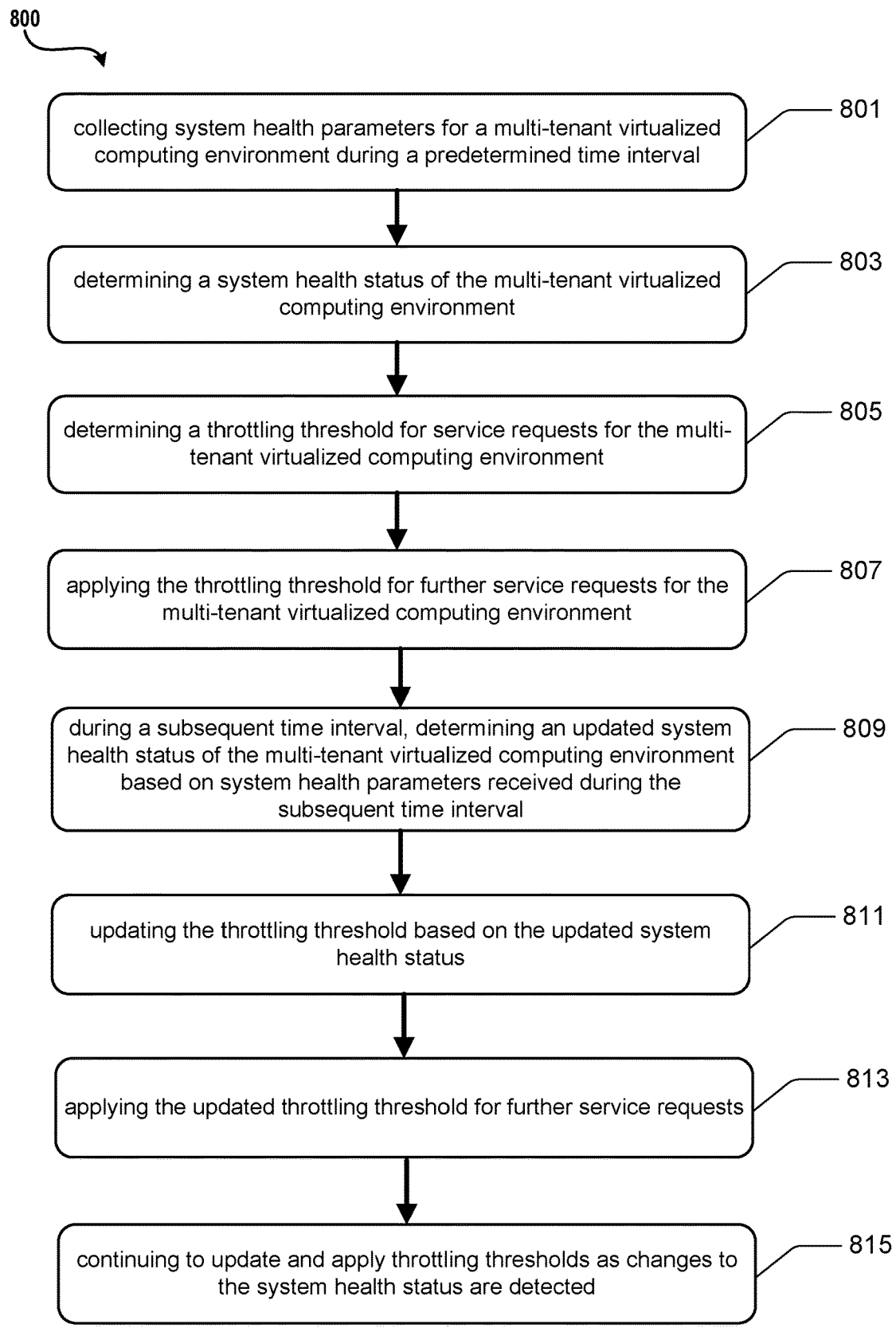
FIG. 8 is a flowchart depicting an example procedure for throttling in accordance with the present disclosure.

Referring to FIG. 8, illustrated is another example operational procedure for managing workloads in a virtualized environment. The operational procedure may be implemented in a system comprising one or more computing devices. Referring to FIG. 8, operation 801 illustrates collecting system health parameters for a multi-tenant virtualized computing environment during a predetermined time interval.

Operation 801 may be followed by operation 803. Operation 803 illustrates based on the collected system health parameters, determining a system health status of the multi-tenant virtualized computing environment.

Operation 803 may be followed by operation 805. Operation 805 illustrates based on the system health status, determining a throttling threshold for service requests for the multi-tenant virtualized computing environment.

Operation 805 may be followed by operation 807. Operation 807 illustrates applying the throttling threshold for further service requests for the multi-tenant virtualized computing environment.

Operation 807 may be followed by operation 809. Operation 809 illustrates during a subsequent time interval, determining an updated system health status of the multi-tenant virtualized computing environment based on system health parameters received during the subsequent time interval.

Operation 809 may be followed by operation 811. Operation 811 illustrates updating the throttling threshold based on the updated system health status.

Operation 811 may be followed by operation 813. Operation 813 illustrates applying the updated throttling threshold for the further service requests.

Operation 813 may be followed by operation 815. Operation 815 illustrates continuing to update and apply throttling thresholds as changes to the system health status are detected during additional time intervals.

The various aspects of the disclosure are described herein with regard to certain examples and embodiments, which are intended to illustrate but not to limit the disclosure. It should be appreciated that the subject matter presented herein may be implemented as a computer process, a computer-controlled apparatus, or a computing system or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures and other types of structures that perform particular tasks or implement particular abstract data types.

Those skilled in the art will also appreciate that the subject matter described herein may be practiced on or in conjunction with other computer system configurations beyond those described herein, including multiprocessor systems. The embodiments described herein may also be practiced in distributed computing environments, where tasks are performed by remote processing devices that are linked through a communications network. In a distributed computing environment, program modules may be located in both local and remote memory storage devices.

Networks established by or on behalf of a user to provide one or more services (such as various types of cloud-based computing or storage) accessible via the Internet and/or other networks to a distributed set of clients may be referred to as a service provider. Such a network may include one or more data centers such as data center 100 illustrated in FIG. 1, which are configured to host physical and/or virtualized computer servers, storage devices, networking equipment and the like, that may be used to implement and distribute the infrastructure and services offered by the service provider.

Figure 9:
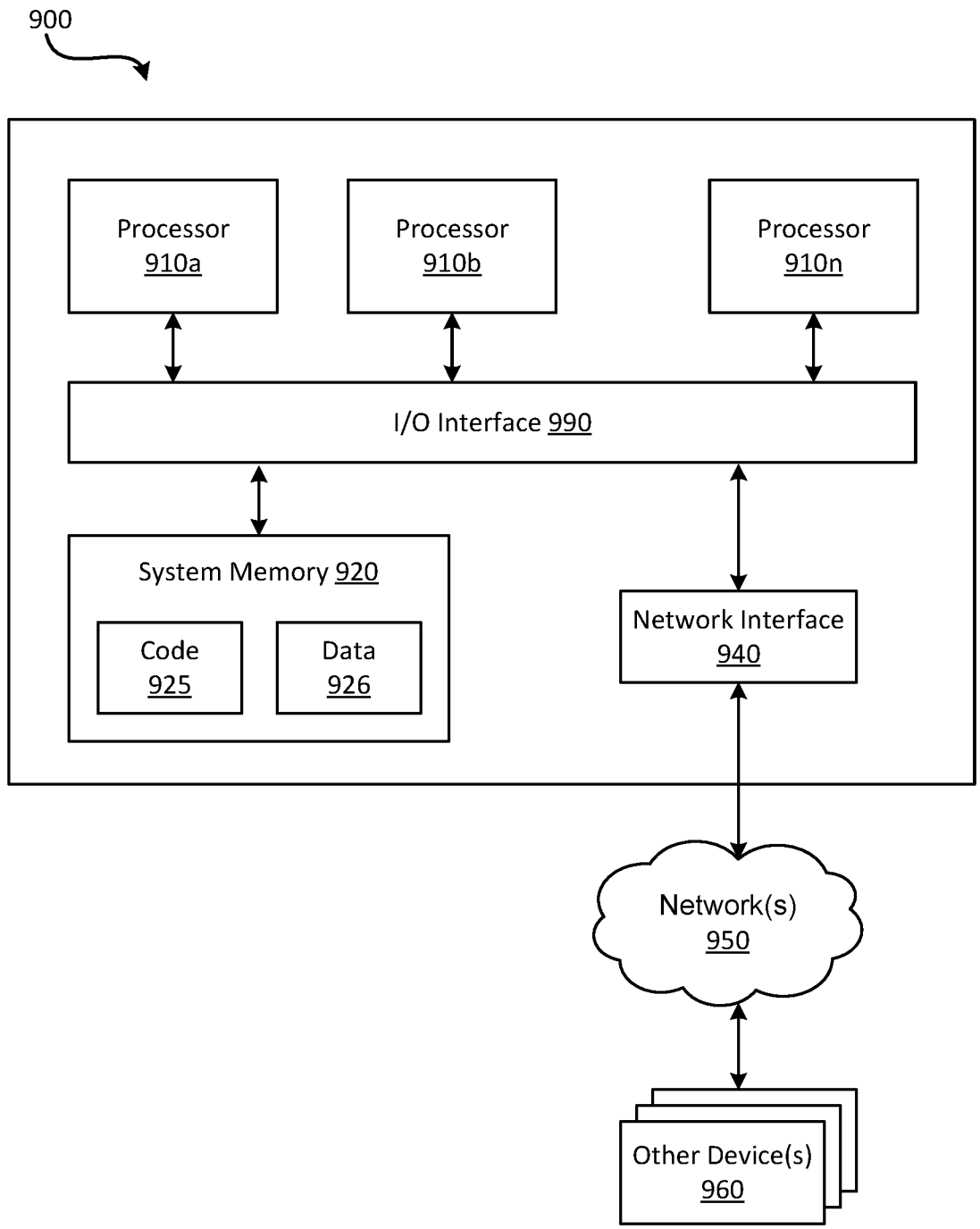
FIG. 9 is an example computing device in accordance with the present disclosure.

In some embodiments, a server that implements a portion or all of one or more of the technologies described herein, including the techniques to implement the capturing of network traffic may include a general-purpose computer system that includes or is configured to access one or more computer-accessible media. FIG. 9 illustrates such a general-purpose computing device 900. In the illustrated embodiment, computing device 900 includes one or more processors 910a, 910b, and/or 910n (which may be referred herein singularly as "a processor 910" or in the plural as "the processors 910") coupled to a system memory 920 via an input/output (I/O) interface 990. Computing device 900 further includes a network interface 940 coupled to I/O interface 990.

In various embodiments, computing device 900 may be a uniprocessor system including one processor 910 or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x96, PowerPC, SPARC, or MIPS ISAs, or any other suitable ISA. In multiprocessor systems, each of processors 910 may commonly, but not necessarily, implement the same ISA.

System memory 920 may be configured to store instructions and data accessible by processor(s) 910. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques and data described above, are shown stored within system memory 920 as code 925 and data 926.

In one embodiment, I/O interface 990 may be configured to coordinate I/O traffic between the processor 910, system memory 920, and any peripheral devices in the device, including network interface 940 or other peripheral interfaces. In some embodiments, I/O interface 990 may perform any necessary protocol, timing, or other data transformations to convert data signals from one component (e.g., system memory 920) into a format suitable for use by another component (e.g., processor 910). In some embodiments, I/O interface 990 may include support for devices attached through various types of peripheral buses, such as a variant of the Peripheral Component Interconnect (PCI) bus standard or the Universal Serial Bus (USB) standard, for example. In some embodiments, the function of I/O interface 990 may be split into two or more separate components. Also, in some embodiments some or all of the functionality of I/O interface 990, such as an interface to system memory 920, may be incorporated directly into processor 910.

Network interface 940 may be configured to allow data to be exchanged between computing device 900 and other device or devices 960 attached to a network or network(s) 950, such as other computer systems or devices as illustrated in FIGS. 1 through 4, for example. In various embodiments, network interface 940 may support communication via any suitable wired or wireless general data networks, such as types of Ethernet networks, for example. Additionally, network interface 940 may support communication via telecommunications/telephony networks such as analog voice networks or digital fiber communications networks, via storage area networks such as Fibre Channel SANs or via any other suitable type of network and/or protocol.

In some embodiments, system memory 920 may be one embodiment of a computer-accessible medium configured to store program instructions and data as described above for FIGS. 1-8 for implementing embodiments of the corresponding methods and apparatus. However, in other embodiments, program instructions and/or data may be received, sent or stored upon different types of computer-accessible media. A computer-accessible medium may include non-transitory storage media or memory media, such as magnetic or optical media, e.g., disk or DVD/CD coupled to computing device 900 via I/O interface 990. A non-transitory computer-accessible storage medium may also include any volatile or non-volatile media, such as RAM (e.g. SDRAM, DDR SDRAM, RDRAM, SRAM, etc.), ROM, etc., that may be included in some embodiments of computing device 900 as system memory 920 or another type of memory. Further, a computer-accessible medium may include transmission media or signals such as electrical, electromagnetic or digital signals, conveyed via a communication medium such as a network and/or a wireless link, such as may be implemented via network interface 940. Portions or all of multiple computing devices, such as those illustrated in FIG. 9, may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices.

Various storage devices and their associated computer-readable media provide non-volatile storage for the computing devices described herein. Computer-readable media as discussed herein may refer to a mass storage device, such as a solid-state drive, a hard disk or CD-ROM drive. However, it should be appreciated by those skilled in the art that computer-readable media can be any available computer storage media that can be accessed by a computing device.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computing devices discussed herein. For purposes of the claims, the phrase "computer storage medium," "computer-readable storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the disclosed computing devices in order to store and execute the software components and/or functionality presented herein. It is also contemplated that the disclosed computing devices may not include all of the illustrated components shown in FIG. 9, may include other components that are not explicitly shown in FIG. 9, or may utilize an architecture completely different than that shown in FIG. 9.

Although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated any reference to "first," "second," etc. items and/or abstract concepts within the description is not intended to and should not be construed to necessarily correspond to any reference of "first," "second," etc. elements of the claims. In particular, within this Summary and/or the following Detailed Description, items and/or abstract concepts such as, for example, individual computing devices and/or operational states of the computing cluster may be distinguished by numerical designations without such designations corresponding to the claims or even other paragraphs of the Summary and/or Detailed Description. For example, any designation of a "first operational state" and "second operational state" of the computing cluster within a paragraph of this disclosure is used solely to distinguish two different operational states of the computing cluster within that specific paragraph—not any other paragraph and particularly not the claims.

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A method for dynamically managing workloads by one or more computing systems of a virtualized computing service provider, the one or more computing systems configured to provide a multi-tenant virtualized computing environment and receive service requests for endpoints in the multi-tenant virtualized computing environment, the method comprising:

during a first of a series of predetermined time intervals, collecting system health parameters for the multi-tenant virtualized computing environment based on service requests received during the first of the series of predetermined time intervals;

based on the collected system health parameters, determining a system health status of the multi-tenant virtualized computing environment during the first of the series of predetermined time intervals;

based on the system health status during the first of the series of predetermined time intervals, determining a first throttling threshold for service requests received during a second of the series of predetermined time intervals, wherein the first throttling threshold is limited to a minimum throttling threshold and maximum throttling threshold;

during the second of the series of predetermined time intervals, applying the first throttling threshold to service requests received during the second of the series of predetermined time intervals;

collecting system health parameters for the multi-tenant virtualized computing environment based on the service requests received during the second of the series of predetermined time intervals;

based on the collected system health parameters collected during the second of the series of predetermined time intervals, determining an updated system health status of the multi-tenant virtualized computing environment during the second of the series of predetermined time intervals;

in response to a determination that the updated system health status is unhealthy, decreasing the first throttling threshold by a multiplicative factor to determine a second throttling threshold;

in response to a determination that the updated system health status is healthy, increasing the first throttling threshold by an additive factor to determine the second throttling threshold, wherein the second throttling threshold is limited to the minimum throttling threshold and maximum throttling threshold;

applying the second throttling threshold for service requests received in a third of the series of predetermined time intervals; and continuing to update the throttling threshold as determined by changes to the system health status based on system health parameters collected during the third and subsequent ones of the series of predetermined time intervals.

2. The method of claim 1, wherein the system health parameters comprise latency for responding to the service requests, system throughput, service request failure rates, CPU usage, memory usage, backlog size, queue size, or a number of active threads.

3. The method of claim 1, wherein the continuing to update further comprises:
collecting system health parameters for the multi-tenant virtualized computing environment based on service requests received during the third and subsequent ones of the series of predetermined time intervals;
based on the system health parameters collected during the third and ones of the subsequent time intervals, determining a system health status of the multi-tenant virtualized computing environment during the third and subsequent ones of the series of predetermined time intervals; and
based on the system health status during the third and subsequent ones of the series of predetermined time intervals, determining subsequent throttling thresholds for service requests for the multi-tenant virtualized computing environment.

4. The method of claim 1, wherein the throttling threshold is applied to service requests from an identified user.

5. The method of claim 1, further comprising sending a notification to users indicating that the throttling threshold has been applied.

6. The method of claim 1, wherein throttling thresholds are determined by one or more gateways of the multi-tenant virtualized computing environment that are configured to receive service requests via an application programming interface (API).

7. A system, comprising:
one or more processors; and
a memory in communication with the one or more processors, the memory having computer-readable instructions stored thereupon that, when executed by the one or more processors, cause the system to perform operations comprising:
during a first of a series of predetermined time intervals, collecting system health parameters for a multi-tenant virtualized computing environment based on service requests received during the first of the series of predetermined time intervals;
based on the collected system health parameters, determining a system health status of the multi-tenant virtualized computing environment during the first of the series of predetermined time intervals;
based on the system health status during the first of the series of predetermined time intervals, determining a first throttling threshold for service requests received during a second of the series of predetermined time intervals, wherein the first throttling threshold is limited to a minimum throttling threshold and maximum throttling threshold;
during the second of the series of predetermined time intervals, applying the first throttling threshold to service requests received during the second of the series of predetermined time intervals;
collecting system health parameters for the multi-tenant virtualized computing environment based on the service requests received during the second of the series of predetermined time intervals;
based on the collected system health parameters collected during the second of the series of predetermined time intervals, determining an updated system health status of the multi-tenant virtualized computing environment during the second of the series of predetermined time intervals;
in response to a determination that the updated system health status is unhealthy, decreasing the first throttling threshold by a multiplicative factor to determine a second throttling threshold;
in response to a determination that the updated system health status is healthy, increasing the first throttling threshold by an additive factor to determine the second throttling threshold, wherein the second throttling threshold is limited to the minimum throttling threshold and maximum throttling threshold;
applying the second throttling threshold for service requests received in a third of the series of predetermined time intervals; and
continuing to update the throttling threshold as determined by changes to the system health status based on system health parameters collected during the third and subsequent ones of the series of predetermined time intervals.

8. The system of claim 7, wherein the system health parameters comprise latency for responding to the service requests, system throughput, service request failure rates, CPU usage, memory usage, backlog size, queue size, or a number of active threads.

9. The system of claim 7, wherein the throttling threshold is applied to service requests from an identified user.

10. The system of claim 7, further comprising sending a notification to users indicating that the throttling threshold has been applied.

11. The system of claim 7, wherein throttling thresholds are determined by one or more gateways of the multi-tenant virtualized computing environment that are configured to receive service requests via an application programming interface (API).

12. The system of claim 7, wherein the continuing to update further comprises:
collecting system health parameters for the multi-tenant virtualized computing environment based on service requests received during the third and subsequent ones of the series of predetermined time intervals;
based on the system health parameters collected during the third and ones of the subsequent time intervals, determining a system health status of the multi-tenant virtualized computing environment during the third and subsequent ones of the series of predetermined time intervals; and
based on the system health status during the third and subsequent ones of the series of predetermined time intervals, determining subsequent throttling thresholds for service requests for the multi-tenant virtualized computing environment.

13. A computer-readable storage medium having computer-executable instructions stored thereupon which, when executed by one or more processors of a computing device, cause the computing device to perform operations comprising:
during a first of a series of predetermined time intervals, collecting system health parameters for a multi-tenant virtualized computing environment based on service requests received during the first of the series of predetermined time intervals;

based on the collected system health parameters, determining a system health status of the multi-tenant virtualized computing environment during the first of the series of predetermined time intervals;

based on the system health status during the first of the series of predetermined time intervals, determining a first throttling threshold for service requests received during a second of the series of predetermined time intervals, wherein the first throttling threshold is limited to a minimum throttling threshold and maximum throttling threshold;

during the second of the series of predetermined time intervals, applying the first throttling threshold to service requests received during the second of the series of predetermined time intervals;

collecting system health parameters for the multi-tenant virtualized computing environment based on the service requests received during the second of the series of predetermined time intervals;

based on the collected system health parameters collected during the second of the series of predetermined time intervals, determining an updated system health status of the multi-tenant virtualized computing environment during the second of the series of predetermined time intervals;

in response to a determination that the updated system health status is unhealthy, decreasing the first throttling threshold by a multiplicative factor to determine a second throttling threshold;

in response to a determination that the updated system health status is healthy, increasing the first throttling threshold by an additive factor to determine the second throttling threshold, wherein the second throttling threshold is limited to the minimum throttling threshold and maximum throttling threshold;

applying the second throttling threshold for service requests received in a third of the series of predetermined time intervals; and continuing to update the throttling threshold as determined by changes to the system health status based on system health parameters collected during the third and subsequent ones of the series of predetermined time intervals.

14. The computer-readable storage medium of claim 13, wherein the system health parameters comprise latency for responding to the service requests, system throughput, service request failure rates, CPU usage, memory usage, backlog size, queue size, or a number of active threads.

15. The computer-readable storage medium of claim 13, wherein the throttling threshold is applied to service requests from an identified user.

16. The computer-readable storage medium of claim 13, further comprising sending a notification to users indicating that the throttling threshold has been applied.

17. The computer-readable storage medium of claim 13, wherein throttling thresholds are determined by one or more gateways of the multi-tenant virtualized computing environment that are configured to receive service requests via an application programming interface (API).

18. The computer-readable storage medium of claim 13, wherein the continuing to update further comprises:

collecting system health parameters for the multi-tenant virtualized computing environment based on service requests received during the third and subsequent ones of the series of predetermined time intervals;

based on the system health parameters collected during the third and ones of the subsequent time intervals, determining a system health status of the multi-tenant virtualized computing environment during the third and subsequent ones of the series of predetermined time intervals; and based on the system health status during the third and subsequent ones of the series of predetermined time intervals, determining subsequent throttling thresholds for service requests for the multi-tenant virtualized computing environment.

\* \* \* \* \*